No. 790,167.

Patented May 16, 1905.

UNITED STATES PATENT OFFICE.

JULIUS ABEL, OF MANNHEIM, AND ARTHUR LÜTTRINGHAUS, OF LUDWIGSHAFEN-ON-THE-RHINE, GERMANY, ASSIGNORS TO BADISCHE ANILIN & SODA FABRIK, OF LUDWIGSHAFEN-ON-THE-RHINE, GERMANY, A CORPORATION OF BADEN.

BLUE-SULFUR DYE AND PROCESS OF MAKING SAME.

SPECIFICATION forming part of Letters Patent No. 790,167, dated May 16, 1905.

Application filed February 21, 1905. Serial No. 246,766.

*To all whom it may concern:*

Be it known that we, JULIUS ABEL, doctor of philosophy and chemist, a citizen of the free Hansa town of Hamburg, residing at Mannheim, in the Grand Duchy of Baden, and ARTHUR LÜTTRINGHAUS, doctor of philosophy and chemist, a subject of the King of Prussia, German Emperor, residing at Ludwigshafen-on-the-Rhine, in the Kingdom of Bavaria, German Empire, have invented new and useful Improvements in Sulfur Coloring-Matters and Processes of Making the Same, of which the following is a specification.

Our invention relates to the production of new blue to violet-blue coloring-matters containing sulfur.

We have discovered that by heating an alkali salt of a para-amido-para$_1$-hydroxydiarylamin body with sulfur new and valuable coloring-matters containing sulfur are obtained which possess the peculiar characteristic that they are difficultly soluble in sodium-sulfid solution in the cold, while in a hot solution they are more readily soluble; but in both cases the solution obtained is almost colorless or possesses only a faint yellow color and no intermediate formation of a blue solution takes place. Vegetable fiber when immersed in a hot solution has an affinity for the colorless leuco compound, and this becomes fixed on the fiber, which remains nearly colorless so long as it is in the solution, but on being exposed to the air becomes blue to violet-blue. In the cold solution the fiber has essentially less affinity for the leuco compound.

Under the term "para-amido-para$_1$-hydroxydiarylamin body" we include the para-amido-para$_1$-hydroxydiarylamin itself

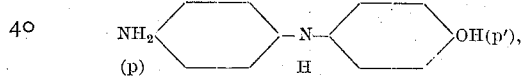

its para-arylamido derivative

and the homologues and substitution products of these compounds. The coloring-matter which we desire to claim specifically is that obtainable by heating the alkali salt of para-phenylamido-para$_1$-hydroxydiphenylamin with sulfur, and this produces pure-blue shades on vegetable fiber.

The following examples will serve to further illustrate the nature of our invention, which, however, is not confined to these examples. The parts are by weight.

Example 1: Introduce twenty-seven and six-tenths (27.6) parts of para-phenylamido-para$_1$-hydroxydiphenylamin into a solution of four (4) parts of caustic soda in ten (10) parts of water, which is contained in an open vessel provided with a stirring apparatus and which is heated in an oil-bath, the temperature of which should be about one hundred and sixty-five degrees centigrade, (165° C.) As soon as the excess of water has distilled off add twenty and a half (20.5) parts of sulfur to the mass and raise the temperature slowly. When an internal temperature of about one hundred and thirty-five degrees centigrade (135° C.) is reached, the whole melts and reaction takes place while frothing considerably. Allow the temperature to rise to about one hundred and fifty degrees centigrade (150° C.) until the frothing ceases. Then heat the product obtained in a drying-oven for about four (4) hours at a temperature of about one hundred and sixty-five degrees centigrade (165° C.) and then for another two (2) to three (3) hours at a temperature of one hundred and seventy-five degrees centigrade, (175° C.) Then mix the dried product with seven and one-tenth (7.1) parts of sulfur and heat for another two (2) hours at a temperature of from one hundred and eighty to one hundred and eighty-five degrees centigrade, (180°–185° C.) Dissolve the product so obtained in a solution of seventy-five (75) parts of sodium sulfid in a large quantity of hot water to which preferably a little caustic soda is added. Filter the solution and then blow air through the filtrate while maintaining this at a temperature of about sixty degrees centigrade, (60° C.) The coloring-matter separates out as a powder with metallic luster and should be filtered off and well washed with hot water. It is slowly soluble in hot sodium-sulfid solution, yielding a pale-yellow solution which dies vegetable fiber shades which on exposure to air become pure blue. The coloring-matter is practically insoluble in cold anilin and is only slightly soluble in hot anilin, yielding a blue solution. It is easily soluble in concentrated sulfuric acid, the solution being blue.

Example 2: Introduce twenty-six and nine-tenths (26.9) parts of dry para-amido-para$_1$-hydroxy-meta$_1$-meta$_1$-dichlordiphenylamin into a solution of four (4) parts of caustic soda in ten (10) parts of water contained in a vessel which is heated in an oil-bath, the temperature of the bath being from one hundred and sixty to one hundred and sixty-five degrees centigrade, (160°–165° C.) After a short time add eighteen and a half (18.5) parts of sulfur and maintain the temperature of the mixture for from four (4) to five (5) hours between one hundred and forty and one hundred and forty-two degrees centigrade, (140°–142° C.) Then dissolve the melt in a hot dilute solution of sixty (60) parts of sodium sulfid, to which conveniently a little caustic soda has been added, and then blow air through the hot solution and filter off the precipitated coloring-matter while hot and wash well with hot water. The coloring-matter when dry is a powder with coppery luster, which is difficultly soluble in cold sodium-sulfid solution, but which is more soluble on warming, and in both cases a colorless or only pale-yellow-colored solution is obtained, upon which at the surface exposed to the air the coloring-matter immediately separates as a skin. The coloring-matter dyes vegetable fiber from a hot sodium-sulfid bath, producing violet-blue shades.

Example 3: Introduce twenty-three (23) parts of para-amido-xylyl-para$_1$-hydroxy-diphenylamin into a solution of four (4) parts of caustic soda and ten (10) parts of water, as described in the foregoing Example 2. As soon as the mixture has become viscous add eighteen (18) parts of sulfur, and after a short time a homogeneous melt is formed which evolves sulfureted hydrogen and which gradually becomes viscous. As soon as the temperature has reached one hundred and forty degrees centigrade (140° C.) place the melt in a drying-oven and heat for from four (4) to six (6) hours at a temperature of between one hundred and sixty-five and one hundred and seventy degrees centigrade, (165°–170° C.) Then dissolve the product in a boiling solution of sixty (60) parts of sodium sulfid and fifteen (15) parts of caustic soda in one thousand (1,000) parts of water. Filter the solution while hot and then blow air through the filtrate while maintaining this latter at a temperature of sixty degrees centigrade, (60° C.) The coloring-matter separates out as a powder with a coppery glance. Filter this off and press and then wash well with boiling water, and, finally, dry it at a fairly high temperature. The coloring-matter is difficultly soluble in cold sodium-sulfid solution; but on warming it is more quickly soluble, yielding a pale-yellow solution which dyes unmordanted fiber violet-blue shades.

Now what we claim is—

1. The process for the production of blue to violet-blue coloring-matters containing sulfur, by heating an alkali salt of a para-amido-para$_1$-hydroxydiarylamin body with sulfur.

2. The process for the production of a blue coloring-matter containing sulfur, by heating an alkali-salt of para-phenyl-amido-para$_1$-hydroxydiphenylamin with sulfur.

3. As new articles of manufacture, the coloring-matters which can be obtained by heating with sulfur an alkali salt of a para-amido-para$_1$-hydroxydiarylamin body, which coloring-matters contain sulfur and which are soluble in hot sodium-sulfid solution yielding pale-yellow solutions without the intermediate formation of a blue solution, from which vegetable fiber takes up a leuco compound which on exposure to the air becomes blue to violet-blue.

4. As a new article of manufacture, the coloring-matter which can be obtained by heating with sulfur an alkali salt of paraphenyl-amido-para$_1$-hydroxydiphenylamin, which coloring-matter contains sulfur, and which is with difficulty soluble in cold sodium-sulfid solution, but more quickly soluble in hot sodium-sulfid solution, yielding a pale-yellow solution without the intermediate formation of a blue solution, and from the hot solution vegetable fiber takes up a leuco compound, which on exposure to the air becomes pure blue.

In testimony whereof we have hereunto set our hands in the presence of two subscribing witnesses.

JULIUS ABEL.
ARTHUR LÜTTRINGHAUS.

Witnesses:
 ERNEST F. EHRHARDT,
 JOS. H. LEUTE.